US012786434B2

(12) United States Patent
Chen et al.

(10) Patent No.: US 12,786,434 B2
(45) Date of Patent: Nov. 3, 2026

(54) CROSS-COMPONENT SAMPLE ADAPTIVE OFFSET

(71) Applicant: MEDIATEK INC., Hsinchu City (TW)

(72) Inventors: Ching-Yeh Chen, Hsinchu City (TW); Tzu-Der Chuang, Hsinchu City (TW); Chih-Wei Hsu, Hsinchu City (TW); Yu-Wen Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/859,009

(22) PCT Filed: Apr. 28, 2023

(86) PCT No.: PCT/CN2023/091768
§ 371 (c)(1),
(2) Date: Oct. 22, 2024

(87) PCT Pub. No.: WO2023/208219
PCT Pub. Date: Nov. 2, 2023

(65) Prior Publication Data

US 2025/0294172 A1 Sep. 18, 2025

Related U.S. Application Data

(60) Provisional application No. 63/336,402, filed on Apr. 29, 2022.

(51) Int. Cl.
*H04N 19/176* (2014.01)
*H04N 19/117* (2014.01)
(Continued)

(52) U.S. Cl.
CPC ......... *H04N 19/176* (2014.11); *H04N 19/117* (2014.11); *H04N 19/186* (2014.11); *H04N 19/82* (2014.11)

(58) Field of Classification Search
CPC .. H04N 19/117; H04N 19/176; H04N 19/182; H04N 19/186; H04N 19/82
See application file for complete search history.

(56) References Cited

U.S. PATENT DOCUMENTS

2015/0178891 A1* 6/2015 Alshina ................. G06F 17/175 382/300
2016/0100189 A1* 4/2016 Pang ...................... H04N 19/44 375/240.13

(Continued)

FOREIGN PATENT DOCUMENTS

CN 114125445 A 3/2022

OTHER PUBLICATIONS

International Search Report and Written Opinion dated Aug. 9, 2023, issued in application No. PCT/CN2023/091768.

(Continued)

*Primary Examiner* — Md N Haque
(74) *Attorney, Agent, or Firm* — McClure, Qualey & Rodack, LLP

(57) ABSTRACT

A video coding method for cross-component sample adaptive offset (CCSAO) is provided. A video coder receives a current sample at a current pixel position of a current block being coded. The video coder selects one luma sample and two chroma samples as luma and chroma collocated samples of the pixel position. Only one or a subset of multiple candidate luma samples in a vicinity of the current pixel position is eligible to be the luma collocated sample of the current pixel position. The video coder selects a pixel category from multiple pixel categories based on the values of the selected luma and chroma collocated samples for the current pixel position. The video coder performs a lookup for an offset based on the selected pixel category. The video coder updates the current sample by applying the offset. The (Continued)

video coder encodes/decodes the current block based on the updated current sample.

8 Claims, 8 Drawing Sheets

(51) Int. Cl.
*H04N 19/186* (2014.01)
*H04N 19/82* (2014.01)

(56) References Cited

U.S. PATENT DOCUMENTS

| | | | | |
|---|---|---|---|---|
| 2017/0054976 | A1 | 2/2017 | Li | |
| 2017/0374384 | A1* | 12/2017 | Xiu | H04N 19/90 |
| 2022/0038726 | A1* | 2/2022 | Kuo | H04N 19/117 |
| 2022/0103866 | A1 | 3/2022 | Bossen | |
| 2022/0337848 | A1* | 10/2022 | Francois | H04N 19/167 |

OTHER PUBLICATIONS

Kuo, C.W., et al.; "Cross-component sample adaptive offset;" 2022 Data Compression Conference; Mar. 2022; pp. 359-368.
Kuo, C.W., et al.; "EE2-5.1: Cross-component Sample Adaptive Offset;" Joint Video Experts Team (JVET) of ITU-T SG 16 WP 3 and ISO/IEC JTC 1/SC 29; Jul. 2021; pp. 1-5.
Kotra, A.M., et al.; "EE2-5.1: Edge-based classifier for Cross-component Sample Adaptive Offset (CCSAO);" Joint Video Experts Team (JVET) of ITU-T SG 16 WP 3 and ISO/IEC JTC 1/SC 29; Jan. 2022; pp. 1-4.

* cited by examiner

CROSS-COMPONENT SAMPLE ADAPTIVE OFFSET

CROSS REFERENCE TO RELATED PATENT APPLICATION(S)

The present disclosure is part of a non-provisional application that claims the priority benefit of U.S. Provisional Patent Application No. 63/336,402, filed on 29 Apr. 2022. Content of above-listed application is herein incorporated by reference.

TECHNICAL FIELD

The present disclosure relates generally to video coding. In particular, the present disclosure relates to methods of using Cross-Component Sample Adaptive Offset (CCSAO) to refine reconstructed samples.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types: quad-tree partitioning, vertical binary tree partitioning, horizontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

Sample Adaptive Offset (SAO) is a technique used in video coding to reduce compression artifacts in reconstructed video frames. SAO is used to suppress banding artifacts (pseudo edges) and ringing artifacts caused by quantization errors of high frequency components in transform domain. In HEVC, the SAO filter is applied adaptively to all samples satisfying certain conditions, e.g., based on gradient. SAO is a process that modifies the decoded samples by conditionally adding an offset value to each sample after the application of the deblocking filter, based on values in look-up tables transmitted by the encoder. HEVC specifies that two SAO types or classes, Band Offset (BO) or Edge Offset (EO), of SAO operations can be selected for each CTU. Both SAO types add a certain offset value to the sample, the offset is chosen from the lookup table based on the local gradient at that sample position. When BO is applied, pixel intensities or pixel values are classified into 32 fixed bands. (Thus, for 8-bit samples, width of each band is 8 pixel values.) The offset of a particular band is added to all pixels that fall in that particular band. When EO is applied, neighboring pixels of a block are used to classify the block into one of four EO types: EO-0 (0 degree), EO-1 (90 degree), EO-2 (135 degree), and EO-3 (45 degree). For each of the EO types, each sample inside the CTB is classified into one of 5 categories: local minima, positive edge, flat area, negative edge, and local maxima. Each category has its corresponding edge offset.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video coding method for cross-component sample adaptive offset (CCSAO). A video coder receives a current sample at a current pixel position of a current block being coded. The video coder selects one luma sample and two chroma samples as luma and chroma collocated samples of the current pixel position. The video coder selects a pixel category from multiple pixel categories based on the values of the selected luma and chroma collocated samples for the current pixel position. The video coder performs a lookup for an offset based on the selected pixel category. The video coder updates the current sample by applying the offset. The video coder encodes or decodes the current block based on the updated current sample.

In some embodiments, only one out of multiple candidate luma samples in a vicinity of the current pixel position is eligible to be the luma collocated sample of the current pixel position. The vicinity of the current pixel position may encompass eight candidate luma samples surrounding the current pixel position and one candidate luma sample at a center position of the vicinity of the current pixel position, and the selected luma collocated sample is at the center position of the vicinity of the current pixel position. In some embodiments, the candidate luma sample at the center position is selected as the luma collocated sample implicitly without being signaled in a bitstream.

In some embodiments, only a subset of the plurality of candidate luma samples in the vicinity of the current pixel position are eligible to be selected as the luma collocated sample or used for deriving the luma collocated sample of the current pixel position. For example, the plurality of candidate luma samples may include nine luma samples while the eligible subset of the plurality of candidate luma samples may include only four candidate luma samples. In some embodiments, a linear average of two or more candidate luma samples selected from the eligible subset of the plurality of candidate luma samples is used as the selected luma collocated sample.

In some embodiments, a first classification index is computed based on the values of the selected luma and chroma collocated samples for the current pixel position, a second classification index is computed based on differences between adjacent candidate luma samples (in the vicinity of the current pixel position) relative to a particular threshold, and the pixel category is selected by using the first and second classification indices. In some embodiments, the particular threshold is determined based on a bit depth of the current sample.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Cross-Component Sample Adaptive Offset (CCSAO)

Cross-component Sample Adaptive Offset (CCSAO) operate as part of SAO process and utilizes the correlation between the three color components (e.g., YUV) as guide to further refine reconstructed samples. Like SAO, CCSAO classifies reconstructed samples into different categories, derives one offset for each category and adds the offset to the reconstructed samples in that category. However, different from conventional SAO which only uses one single component (whether luma or chroma) of the current sample as input, CCSAO utilizes all three color components (luma and chroma) to classify the current sample into different categories.

Figure 1:
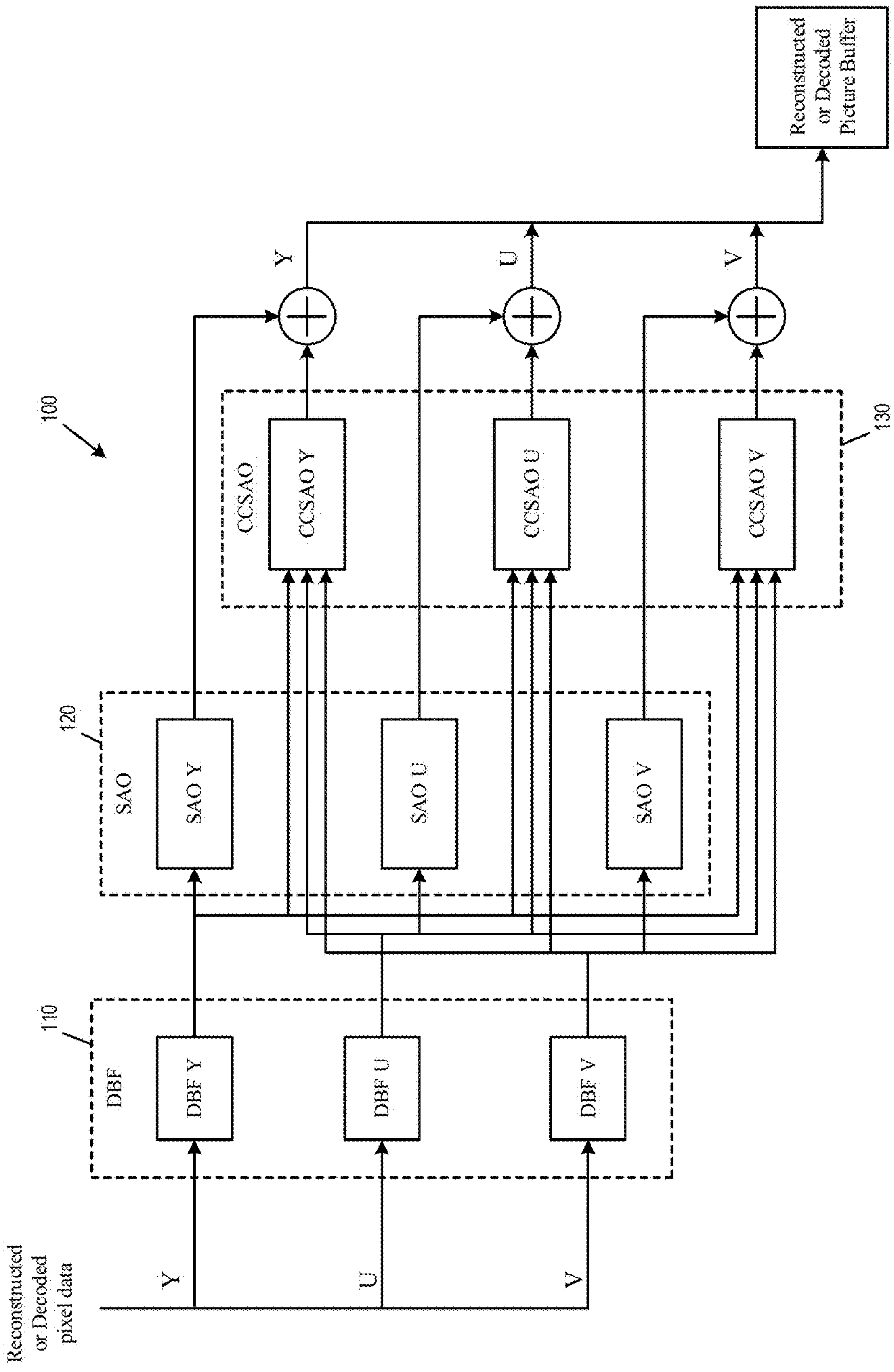
FIG. 1 shows a video coding workflow when cross-component sample adaptive offset (CCSAO) is applied.

FIG. 1 shows a video coding workflow when cross-component sample adaptive offset (CCSAO) is applied. The figure shows the video coding workflow of an in-loop filter 100 of a video encoder or decoder. An example video encoder that may incorporate the functionalities of the in-loop filter 100 will be described by reference to FIG. 6 below. An example video decoder that may incorporate the functionalities of the in-loop filter 100 will be described by reference to FIG. 8 below.

The loop filter 100 receives current samples (reconstructed or decoded pixel data) for all color components (YUV), and applies deblock filter (DBF) 110, sample adaptive offset (SAO) 120, and cross-component sample adaptive offset (CCSAO) 130. The output of the in-loop filter 100 is sent to a reconstructed or decoded picture buffer for display and/or coding of subsequent pixel blocks.

As illustrated, the reconstructed (or decoded) pixel data of the color components are processed by their respective deblocking filters. The output samples from the de-blocking filter are used as the input of the SAO 120 and the CCSAO 130. The SAO 120 and the CCSAO 130 are applied for all three components. The SAO 120 and CCSAO 130 both include units for each of the YUV components (SAO-Y, SAO-U, SAO-V; CCSAO-Y, CCSAO-U, CCSAO-V). The output of each color component from the deblock filter 110 is provided to the SAO of the corresponding respective color component. The output of each color component from the deblock filter 110 is provided to the CCSAOs of all three components. In other words, SAO of a color component is dependent on only the samples of that component, while CCSAO of any color component is dependent on samples of all three color components, thereby allowing cross-component sample offset. The offsets generated by the SAO 120 and the CCSAO 130 are both applied (added) to the output samples of the in-loop filter 100.

Figure 2:
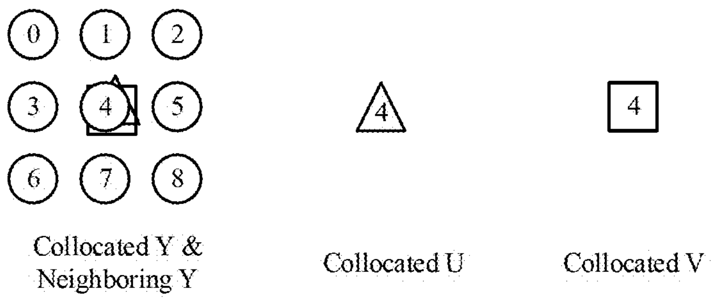
FIG. 2 illustrates candidate positions used for CCSAO classifier.

To apply band offset (BO) in CCSAO, for a current given reconstructed sample, three collocated samples $\{Y_{col}, U_{col}, V_{col}\}$ are used to represent the three components of the given sample. The luma collocated sample ($Y_{col}$) can be selected from multiple candidate collocated positions. In some embodiments, the luma collocated sample (Y col) can be chosen from 9 candidate positions, while the collocated chroma sample positions ($U_{col}$ and $V_{col}$) are fixed. FIG. 2 illustrates candidate positions used for CCSAO classifier.

The three selected collocated samples $\{Y\ col, U_{col}, V_{col}\}$ are used to classify the given sample into one of many different categories that correspond to different combinations of YUV components. The values of the three collocated samples are classified into three different band indices $\{band_Y, band_U, band_V\}$, each band index identifying one BO category for one color component. The three band indices for the three components YUV are defined according to:

$$band_Y = (Y_{col} * N_Y) \gg BD \quad (1)$$

$$band_U = (U_{col} * N_U) \gg BD$$

$$band_V = (V_{col} * N_V) \gg BD$$

where $\{Y_{col}, U_{col}, V_{col}\}$ are the three collocated samples selected to classify the current sample; $\{N_Y, N_U, N_V\}$ are the numbers of equally divided bands applied to full range of $\{Y_{col}, U_{col}, V_{col}\}$ respectively. BD is the internal coding bit-depth. The band indices $\{band_Y, band_U, band_V\}$ are used to determine one joint index i that represents the BO category of the given sample. The joint index i is defined as:

$$i = band_Y * (N_U * N_V) + band_U * N_V + band_V \quad (2)$$

One CCSAO offset is determined and added to the reconstructed (luma or chroma) samples that fall into that category indicated by the index i:

$$C'_{rec} = Clip1(C_{rec} + \sigma_{CCSAO}[i]) \quad (3)$$

$C_{rec}$ and $C'_{rec}$ are respectively the reconstructed (chroma) samples before and after the CCSAO is applied. The term $\sigma_{CCSAO}[i]$ is the value of the CCSAO offset applied to the i-th BO category.

Like SAO, different classifiers can be applied to different local region to further enhance the whole picture quality. The parameters for each classifier (e.g., the position of $Y_{col}$, $N_Y$, $N_U$, $N_V$, and offsets) are signaled at picture level, and the classifier to be used is explicitly signaled and switched at CTB level. For each classifier, the maximum of $\{N_Y, N_U, N_V\}$ is set to $\{16, 4, 4\}$, and offsets are constrained to be within the range [−15, 15]. At most 4 classifiers are used per frame.

In some embodiments, the output of SAO, bilateral filter (BIF), and CCSAO are added to the reconstructed chroma samples (provided by deblock buffer or DBF) and jointly clipped. The clipped result provided to the adaptive loop filter (ALF) as chroma samples to be further process in the video coding process.

Figure 3:
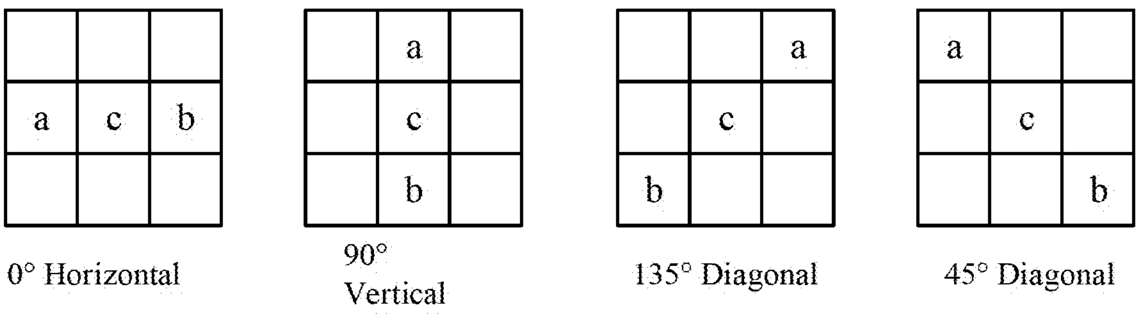
FIG. 3 conceptually illustrates pixel patterns for CCSAO edge offset (EO) sample classifications.

Similar to edge classifier of SAO in VVC, the edge-based classifier of CCSAO may also use 1-D directional patterns for sample classification: horizontal, vertical, 135° diagonal and 45° diagonal. FIG. 3 conceptually illustrates pixel patterns for CCSAO edge offset (EO) sample classifications. Each pixel pattern includes 3 pixels in a 1-D direction. The four 1-D directional patterns correspond to 0° or horizontal (EO class=0), 90° or vertical (EO class=1), 135° diagonal (EO class=2), and 45° diagonal (EO class=3). For each 1-D pattern, each sample is classified based on the sample difference between the luma sample value labeled as "c" and its two neighbor luma samples labeled as "a" and "b" along the selected 1-D pattern.

Similar to SAO, the encoder may decide the best 1-D directional pattern using the rate-distortion optimization (RDO) and signal this additional information in each classifier/set. Both the sample differences "a-c" and "b-c" are compared against a pre-defined threshold value (Th) to derive the final "class_idx" information. The encoder may select the best "Th" value from an array of pre-defined threshold values based on RDO and the index into the "Th" array is signaled.

Furthermore, an additional difference between CCSAO edge-based classifier and the SAO edge classifier in VVC is that, in the case of CCSAO edge-based classifier, Chroma samples use the co-located Luma samples for deriving the edge information (samples "a", "c" and "b" are the co-located luma samples) whereas, in the case of SAO edge classifier, Chroma samples use its own neighboring samples for deriving the edge information. The Edge-based classifier process for CCSAO is formulated as follows:

$$Ea = (a-c < 0)\ ?\ (a-c < (-Th)\ ?\ 0:1) : (a-c < (Th)\ ?\ 2:3) \quad (4)$$

$$Eb = (b-c < 0)\ ?\ (b-c < (-Th)\ ?\ 0:1) : (b-c < (Th)\ ?\ 2:3) \quad (5)$$

$$class\_idx = i_B * 16 + Ea * 4 + Eb \quad (6)$$

$$C'_{rec} = Clip1(C_{rec} + \sigma_{CCSAO}[class\_idx]) \quad (7)$$

The index $i_B$ can be derived as follows:

$$i_B = (cur * N_{cur}) \gg BD \text{ or} \quad (8)$$

$$i_B = (col1 * N_{col1}) \gg BD \text{ or}$$

$$i_B = (col2 * N_{col2}) \gg BD$$

"cur" is the current sample being processed, col1 and col2 are the co-located samples. When the current sample being process is a luma sample Y, col1 and col2 are the co-located $C_b$ and $C_r$ samples respectively. When the current sample being processed is a Chroma ($C_b$) samples, col1 and col2 are the co-located Y and $C_r$ samples respectively. When the current sample being processed is a Chroma ($C_r$) sample, col1 and col2 are the co-located Y and $C_b$ samples respectively. Based on rate-distortion-optimization (RDO), the encoder may signal one among the samples "cur", "col1", "col2" used in deriving the band information.

A. Selection of Luma Collocated Sample

As mentioned, in CCSAO-BO, the position of luma collocated sample can be one of nine positions as shown in FIG. 2. Allowing multiple candidates of luma collocated samples facilitates handling of different sampling ratios and different phases in different color component (e.g., YUV420, YUV422, YUV411, or YUV444). However, allowing multiple candidates of luma collocated samples may induce phase shift issues when CCSAO-BO is applied to luma component. To prevent the phase shift issue, in some embodiments, the video coder removes (i.e., does not allow) selection of (the position of) luma collocated samples when CCSAO-BO is applied to luma component. The corresponding syntax used to indicate the selected position of luma collocated sample is not signaled, and the selected position of luma collocated sample is inferred to be the center position, i.e., the position of to-be-processed sample (labeled '4' in FIG. 2, or the position closest to the to-be-processed sample.) In some embodiments, the corresponding syntax used to indicate the selected position of luma collocated sample is conditionally signaled in CCSAO-BO. In some embodiments, when CCSAO-BO is applied to the luma component, the corresponding syntax used to indicate the selected position of luma collocated sample is always signaled but the value shall indicate the center position, i.e., the position of to-be-processed sample.

Figure 4:
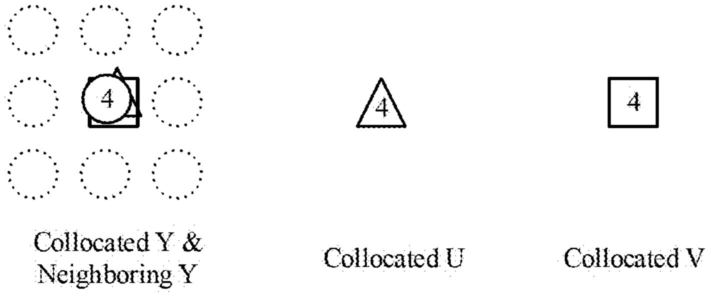
FIG. 4 conceptually illustrates candidate positions used for CCSAO classifier when the center position is always selected as the luma collocated sample.

FIG. 4 conceptually illustrates candidate positions used for CCSAO classifier when the center position is always selected as the luma collocated sample. As illustrated, the candidate luma sample at the position '4' is the only eligible candidate that can be selected to be the luma collocated sample for CCSAO offset classification.

B. Reduced Candidates of Luma Collocated Samples

As mentioned, in CCSAO-BO, the position of the luma collocated sample can be one of nine positions (labeled '0' through '8') as shown in FIG. 2. The motivation of allowing multiple candidates of luma collocated samples is to facilitate handling of different sampling ratios and different subsampling phases in different color component (e.g., YUV420, YUV422, YUV411, or YUV444). However, the phases in different sampling ratios are usually limited in a 2×2 region of corresponding luma positions. (For example, if the chroma position is (x, y) in one picture and the sampling ratios of luma and chroma are different, the chroma phase is usually located in the 2×2 region from (2x, 2y) to (2x+1, 2y+1) in terms of luma position.) Therefore, in some embodiments, the candidates of luma collocated samples are reduced from one 3×3 square in which the center position is (2x, 2y) to one 2×2 square in which the top-left position is (2x, 2y).

Figure 5:
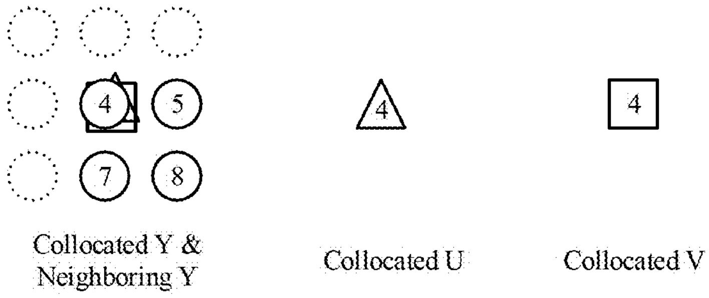
FIG. 5 conceptually illustrates a reduced set of candidate positions for luma collocated samples for CCSAO offset determination.

More generally, in some embodiments, only a subset of the candidate luma samples in the vicinity of the current pixel position are eligible to be selected as the luma collocated sample or used for deriving the luma collocated sample of the current pixel position. For example, in some embodiments, the candidates of luma collocated samples are reduced from sample positions {0, 1, 2, 3, 4, 5, 6, 7, 8} to sample positions {4, 5, 7, 8}, as shown in FIG. 5, which illustrates a reduced set of candidate positions for luma collocated samples for CCSAO offset determination.

In some embodiments, the number of candidates of luma collocated samples is more than 4, but only the luma samples in one 2×2 square are used to generate the corresponding collocated samples by using linear or non-linear combination. For example, the linear combination can be the average of {4} and {7}, the average of {4}, {5}, {7}, and {8}, the weighted average of {4}, {5}, {7}, and {8}, and so on. The non-linear combination can be the maximum value of {4}, {5}, {7}, and {8}, the minimum value of {4}, {5}, {7}, and {8}, the medium value of {4}, {5}, {7}, and {8}, the common value among {4}, {5}, {7}, and {8}, the different one among {4}, {5}, {7}, and {8}, and so on. After reducing the candidates from one 3×3 square in which the center position is (2x, 2y) to one 2×2 square in which the top-left position is (2x, 2y), the handling of boundary conditions for CCSAO-BO (e.g., picture boundary, virtual boundary, subpicture boundary, tile boundary, slice boundary, . . . ) becomes similar to that of SAO-BO. That is, the boundary process in SAO-BO can be applied to CCSAO-BO.

C. Unified EO Classification Rules of CCSAO-EO and SAO-EO

In CCSAO-EO, the classification index (class_idx in Eq. (7), or CCSAO-EO_class_idx) maybe calculated according to the following equations:

$$CCSAO\text{-}EO\text{-}Ea = (a-c<0)\ ?\ (a-c<(-Th)\ ?\ 0:1):(a-c<(Th)\ ?\ 2:3) \quad (9)$$

$$CCSAO\text{-}EO\text{-}Eb = (b-c<0)\ ?\ (b-c<(-Th)\ ?\ 0:1):(b-c<(Th)\ ?\ 2:3) \quad (10)$$

$$\text{CCSAO\_EO\_class\_idx} = i_B * CCSAO\text{-}EO\text{-}Ea*4 + CCSAO\text{-}EO\text{-}Eb \quad (11)$$

The term $i_B$*16 in Eq. (10) is the class index contributed from BO, and the remaining parts of Eq. (11) is class index contribution from EO. The classification method in Eq. (11) is asymmetric, i.e., the classification results are different when the neighboring samples a and b are switched. On the other hand, for SAO-EO, the classification index is calculated by the following equations:

$$SAO\text{-}EO\text{-}Ea = (a-c<0)\ ?\ (a-c<(-Th)\ ?\ 0:1):(a-c<(Th)\ ?\ 1:2) \quad (12)$$

$$SAO\text{-}EO\text{-}Eb = (b-c<0)\ ?\ (b-c<(-Th)\ ?\ 0:1):(b-c<(Th)\ ?\ 1:2) \quad (13)$$

$$\text{SAO\_EO\_class\_idx} = SAO\text{-}EO\text{-}Ea + SAO\text{-}EO\text{-}Eb \quad (14)$$

"Th" is set to 0 in SAO-EO. This classification method in Eq. (14) is symmetric, i.e., the classification results are the same when the neighboring samples a and b are switched.

Some embodiments provide a method for unifying the classification methods of CCSAO-EO and SAO-EO. In some embodiments, the equations of SAO-EO-Ea and SAO-EO-Eb are used to replace CCSAO-EO-Ea and CCSAO-EO-Eb in Eq. (10). That is, the equation is modified to become:

$$\text{CCSAO\_EO\_class\_idx} = i_B * 16 + SAO\text{-}EO\text{-}Ea*3 + SAO\text{-}EO\text{-}Eb \quad (15)$$

Eq. (15) is still asymmetric, and "Th" can be different and signaled in CCSAO-EO. In some embodiments, the classification of CCSAO-EO can be modified as:

$$\text{CCSAO\_EO\_class\_idx} = i_B * 16 + SAO\text{-}EO\text{-}Ea + SAO\text{-}EO\text{-}Eb \quad (16)$$

Eq. (16) is symmetric, and "Th" can be different and signaled in CCSAO-EO. In some embodiments, the classification of SAO-EO is modified as:

$$\text{SAO\_EO\_class\_idx} = CCSAO\text{-}EO\text{-}Ea*4 + CCSAO\text{-}EO\text{-}Eb \quad (17)$$

Eq. (17) is asymmetric, and "Th" is inferred to be 0. In some embodiment, the classification of SAO-EO is modified as:

$$\text{SAO\_EO\_class\_idx} = SAO\text{-}EO\text{-}Ea*3 + CCSAO\text{-}EO\text{-}Eb \quad (18)$$

Eq. (18) is asymmetric, and "Th" is inferred to be 0. In some embodiments, different "Th" values are supported in SAO-EO and the selected one is signaled in the bitstream. The supported "Th" values in SAO-EO can be different to those in CCSAO-EO, the same as CCSAO-EO, or a subset of CCSAO-EO.

In some embodiments, the "Th" (threshold) values are dependent on the input bit depth. When input bit depth is changed, the "Th" values are also changed accordingly. For example, one set for "Th" values is defined when input bit-depth is equal to 8. If the input bit depth is increased from 8 to 10, then the corresponding values of "Th" are also multiplied by (1<<(10-8)). In some embodiments, both symmetric and asymmetric classification methods are supported in CCSAO-EO, and one flag is signaled to indicate which method is used.

II. Example Video Encoder

Figure 6:
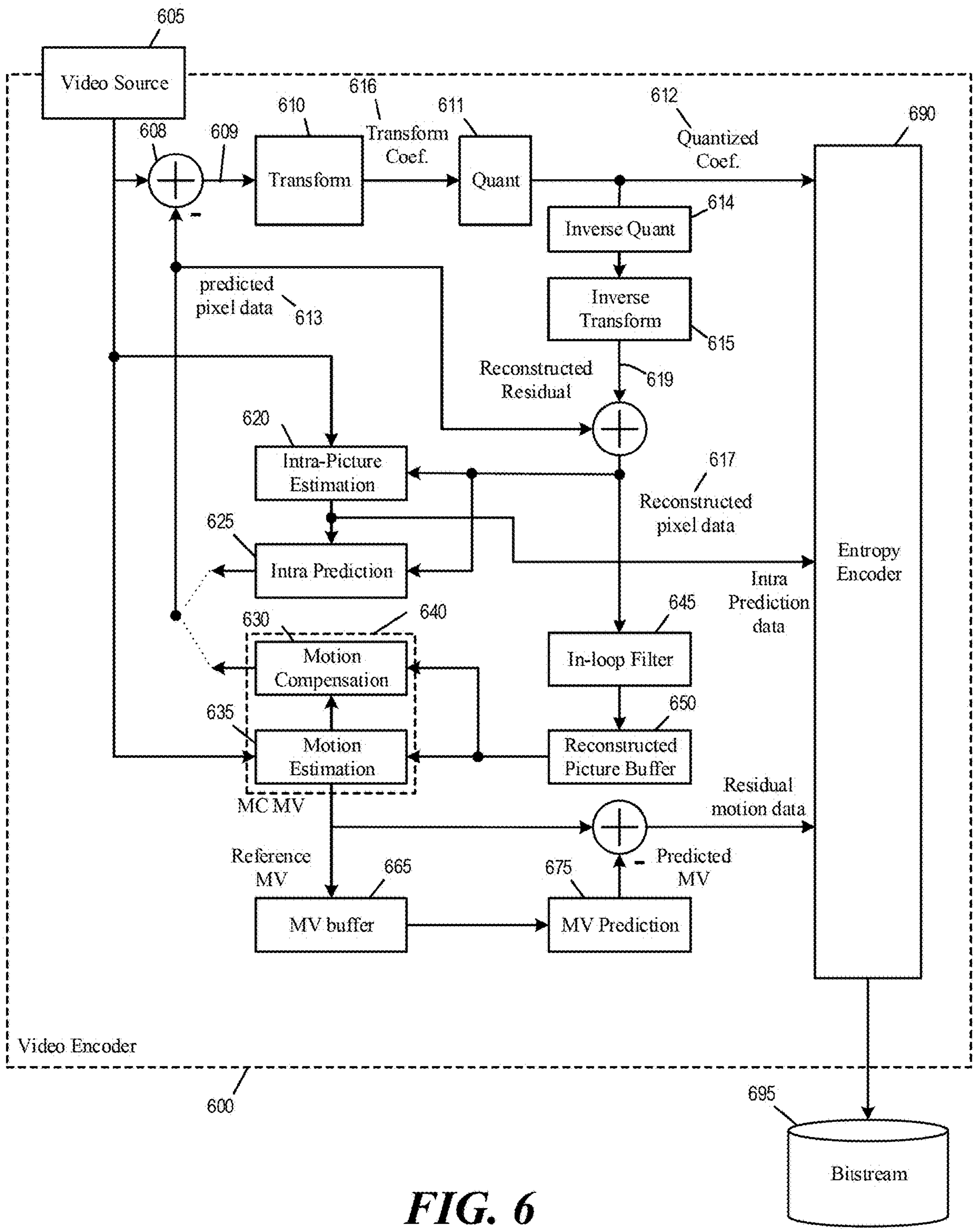
FIG. 6 illustrates an example video encoder that may implement CCSAO.

FIG. 6 illustrates an example video encoder 600 that may implement CCSAO. As illustrated, the video encoder 600 receives input video signal from a video source 605 and encodes the signal into bitstream 695. The video encoder 600 has several components or modules for encoding the signal from the video source 605, at least including some components selected from a transform module 610, a quantization module 611, an inverse quantization module 614, an inverse transform module 615, an intra-picture estimation module 620, an intra-prediction module 625, a motion compensation module 630, a motion estimation module 635, an in-loop filter 645, a reconstructed picture buffer 650, a MV buffer 665, and a MV prediction module 675, and an entropy encoder 690. The motion compensation module 630 and the motion estimation module 635 are part of an inter-prediction module 640.

In some embodiments, the modules 610-690 are modules of software instructions being executed by one or more processing units (e.g., a processor) of a computing device or electronic apparatus. In some embodiments, the modules 610-690 are modules of hardware circuits implemented by one or more integrated circuits (ICs) of an electronic apparatus. Though the modules 610-690 are illustrated as being separate modules, some of the modules can be combined into a single module.

The video source 605 provides a raw video signal that presents pixel data of each video frame without compression. A subtractor 608 computes the difference between the raw video pixel data of the video source 605 and the predicted pixel data 613 from the motion compensation module 630 or intra-prediction module 625 as prediction residual 609. The transform module 610 converts the difference (or the residual pixel data or residual signal 608) into transform coefficients (e.g., by performing Discrete Cosine Transform, or DCT). The quantization module 611 quantizes the transform coefficients into quantized data (or quantized coefficients) 612, which is encoded into the bitstream 695 by the entropy encoder 690.

The inverse quantization module 614 de-quantizes the quantized data (or quantized coefficients) 612 to obtain transform coefficients, and the inverse transform module 615 performs inverse transform on the transform coefficients to produce reconstructed residual 619. The reconstructed residual 619 is added with the predicted pixel data 613 to produce reconstructed pixel data 617. In some embodiments, the reconstructed pixel data 617 is temporarily stored in a line buffer (not illustrated) for intra-picture prediction and spatial MV prediction. The reconstructed pixels are filtered by the in-loop filter 645 and stored in the reconstructed picture buffer 650. In some embodiments, the reconstructed picture buffer 650 is a storage external to the video encoder 600. In some embodiments, the reconstructed picture buffer 650 is a storage internal to the video encoder 600.

The intra-picture estimation module 620 performs intra-prediction based on the reconstructed pixel data 617 to produce intra prediction data. The intra-prediction data is provided to the entropy encoder 690 to be encoded into bitstream 695. The intra-prediction data is also used by the intra-prediction module 625 to produce the predicted pixel data 613.

The motion estimation module 635 performs inter-prediction by producing MVs to reference pixel data of previously decoded frames stored in the reconstructed picture buffer 650. These MVs are provided to the motion compensation module 630 to produce predicted pixel data.

Instead of encoding the complete actual MVs in the bitstream, the video encoder 600 uses MV prediction to generate predicted MVs, and the difference between the MVs used for motion compensation and the predicted MVs is encoded as residual motion data and stored in the bitstream 695.

The MV prediction module 675 generates the predicted MVs based on reference MVs that were generated for encoding previously video frames, i.e., the motion compensation MVs that were used to perform motion compensation. The MV prediction module 675 retrieves reference MVs from previous video frames from the MV buffer 665. The video encoder 600 stores the MVs generated for the current video frame in the MV buffer 665 as reference MVs for generating predicted MVs.

The MV prediction module 675 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 695 by the entropy encoder 690.

The entropy encoder 690 encodes various parameters and data into the bitstream 695 by using entropy-coding techniques such as context-adaptive binary arithmetic coding (CABAC) or Huffman encoding. The entropy encoder 690 encodes various header elements, flags, along with the quantized transform coefficients 612, and the residual motion data as syntax elements into the bitstream 695. The bitstream 695 is in turn stored in a storage device or transmitted to a decoder over a communications medium such as a network.

The in-loop filter 645 performs filtering or smoothing operations on the reconstructed pixel data 617 to reduce the artifacts of coding, particularly at boundaries of pixel blocks. In some embodiments, the filtering or smoothing operations performed by the in-loop filter 645 include deblock filter (DBF), sample adaptive offset (SAO), cross-component adaptive offset (CCSAO), and/or adaptive loop filter (ALF). An example in-loop filter that applies CCSAO offsets to YUV samples is described above by reference to FIG. 1.

In some embodiments, when determining an CCSAO offset to apply to a current pixel sample, the in-loop filter 645 always select a candidate luma sample at the position of (or closest to) the current pixel position, unless otherwise explicitly signaled in the bitstream by the entropy encoder 690. In some embodiments, only a subset (e.g., 4 out of 9) of the candidate luma samples in the vicinity of the current pixel position are eligible to be selected as the luma collocated sample or used for deriving the luma collocated sample of the current pixel position. In some embodiments, the in-loop filter 645 computes a classification index based on differences between adjacent candidate luma samples (in the vicinity of the current pixel position) relative to a particular threshold that is determined based on a bit depth of the current sample. Some of the CCSAO operations of the in-loop filter 845 are described in Section I above.

Figure 7:
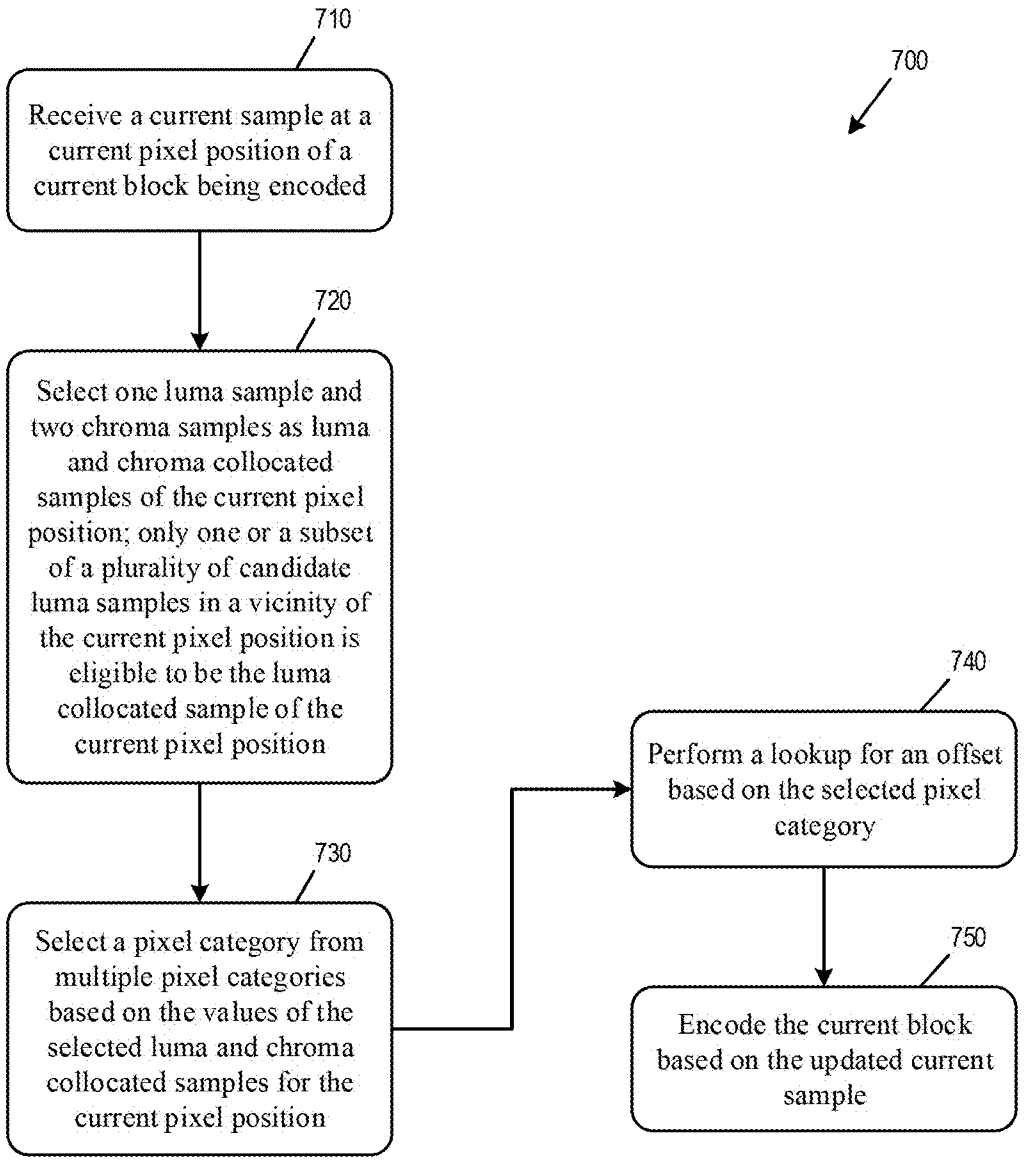
FIG. 7 conceptually illustrates a process for performing CCSAO in some embodiments.

FIG. 7 conceptually illustrates a process 700 for performing CCSAO in some embodiments. In some embodiments, one or more processing units (e.g., a processor) of a computing device implementing the encoder 600 performs the process 700 by executing instructions stored in a computer readable medium. In some embodiments, an electronic apparatus implementing the encoder 600 performs the process 700.

The encoder receives (at block 710) a current sample at a current pixel position of a current block being encoded.

The encoder selects (at block 720) one luma sample and two chroma samples as luma and chroma collocated samples of the current pixel position. In some embodiments, only one out of a plurality of candidate luma samples in a vicinity of the current pixel position is eligible to be the luma collocated sample of the current pixel position. The vicinity of the current pixel position may encompass eight candidate luma samples surrounding the current pixel position and one candidate luma sample at a center position of the vicinity of the current pixel position, and the selected luma collocated sample is at the center position of the vicinity of the current pixel position. In some embodiments, the candidate luma sample at the center position is selected as the luma collocated sample implicitly without being signaled in a bitstream.

In some embodiments, only a subset of the plurality of candidate luma samples in the vicinity of the current pixel position are eligible to be selected as the luma collocated sample or used for deriving the luma collocated sample of the current pixel position. For example, the plurality of candidate luma samples may include nine luma samples while the eligible subset of the plurality of candidate luma samples may include only four candidate luma samples. In some embodiments, a linear average of two or more candidate luma samples selected from the eligible subset of the plurality of candidate luma samples is used as the selected luma collocated sample.

The encoder selects (at block 730) a pixel category from a plurality of pixel categories based on values of the selected luma and chroma collocated samples for the current pixel position. In some embodiments, a first classification index is computed based on the values of the selected luma and chroma collocated samples for the current pixel position (e.g., Eq. (2) or (8)), a second classification index is computed based on differences between adjacent candidate luma samples (in the vicinity of the current pixel position) relative to a particular threshold (e.g., Eq. (15) or (16)), and the pixel category is selected by using the first and second classification indices (e.g., Eq. (6) and (7)). In some embodiments, the particular threshold is determined based on a bit depth of the current sample.

The encoder performs (at block 740) a lookup for an offset based on the selected pixel category. The encoder updates (at block 750) the current sample by applying the offset (e.g., Eq. (7)).

The encoder encodes (at block 760) the current block based on the updated current sample.

III. Example Video Decoder

In some embodiments, an encoder may signal (or generate) one or more syntax element in a bitstream, such that a decoder may parse said one or more syntax element from the bitstream.

Figure 8:
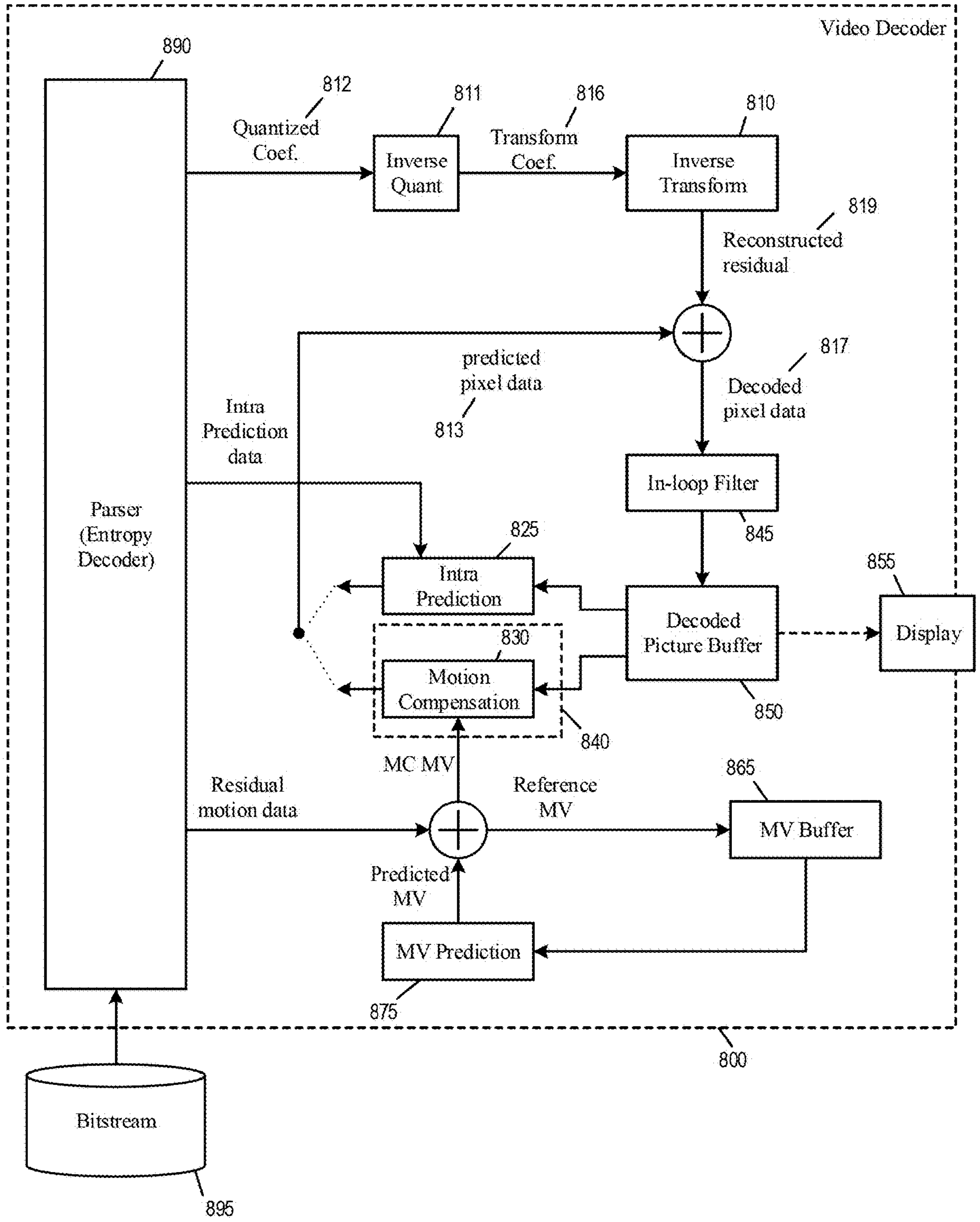
FIG. 8 illustrates an example video decoder that may implement CCSAO.

FIG. 8 illustrates an example video decoder 800 that may implement CCSAO. As illustrated, the video decoder 800 is an image-decoding or video-decoding circuit that receives a bitstream 895 and decodes the content of the bitstream into pixel data of video frames for display. The video decoder 800 has several components or modules for decoding the bitstream 895, including some components selected from an inverse quantization module 811, an inverse transform module 810, an intra-prediction module 825, a motion compensation module 830, an in-loop filter 845, a decoded picture buffer 850, a MV buffer 865, a MV prediction module 875, and a parser 890. The motion compensation module 830 is part of an inter-prediction module 840.

In some embodiments, the modules 810-890 are modules of software instructions being executed by one or more processing units (e.g., a processor) of a computing device. In some embodiments, the modules 810-890 are modules of hardware circuits implemented by one or more ICs of an electronic apparatus. Though the modules 810-890 are illustrated as being separate modules, some of the modules can be combined into a single module.

The parser 890 (or entropy decoder) receives the bitstream 895 and performs initial parsing according to the syntax defined by a video-coding or image-coding standard. The parsed syntax element includes various header elements, flags, as well as quantized data (or quantized coefficients) 812. The parser 890 parses out the various syntax elements by using entropy-coding techniques such as context-adaptive binary arithmetic coding (CABAC) or Huffman encoding.

The inverse quantization module 811 de-quantizes the quantized data (or quantized coefficients) 812 to obtain transform coefficients, and the inverse transform module 810 performs inverse transform on the transform coefficients 816 to produce reconstructed residual signal 819. The reconstructed residual signal 819 is added with predicted pixel data 813 from the intra-prediction module 825 or the motion compensation module 830 to produce decoded pixel data 817. The decoded pixels data are filtered by the in-loop filter 845 and stored in the decoded picture buffer 850. In some embodiments, the decoded picture buffer 850 is a storage external to the video decoder 800. In some embodiments, the decoded picture buffer 850 is a storage internal to the video decoder 800.

The intra-prediction module 825 receives intra-prediction data from bitstream 895 and according to which, produces the predicted pixel data 813 from the decoded pixel data 817 stored in the decoded picture buffer 850. In some embodiments, the decoded pixel data 817 is also stored in a line buffer (not illustrated) for intra-picture prediction and spatial MV prediction.

In some embodiments, the content of the decoded picture buffer 850 is used for display. A display device 855 either retrieves the content of the decoded picture buffer 850 for display directly, or retrieves the content of the decoded picture buffer to a display buffer. In some embodiments, the display device receives pixel values from the decoded picture buffer 850 through a pixel transport.

The motion compensation module 830 produces predicted pixel data 813 from the decoded pixel data 817 stored in the decoded picture buffer 850 according to motion compensation MVs (MC MVs). These motion compensation MVs are decoded by adding the residual motion data received from the bitstream 895 with predicted MVs received from the MV prediction module 875.

The MV prediction module 875 generates the predicted MVs based on reference MVs that were generated for decoding previous video frames, e.g., the motion compensation MVs that were used to perform motion compensation. The MV prediction module 875 retrieves the reference MVs of previous video frames from the MV buffer 865. The video decoder 800 stores the motion compensation MVs generated for decoding the current video frame in the MV buffer 865 as reference MVs for producing predicted MVs.

The in-loop filter 845 performs filtering or smoothing operations on the decoded pixel data 817 to reduce the artifacts of coding, particularly at boundaries of pixel blocks. In some embodiments, the filtering or smoothing operations performed by the in-loop filter 845 include deblock filter (DBF), sample adaptive offset (SAO), cross-component sample adaptive offset (CCSAO), and/or adaptive loop filter (ALF).

An example in-loop filter that applies CCSAO offsets to YUV samples is described above by reference to FIG. 1. In some embodiments, when determining an CCSAO offset to apply to a current pixel sample, the in-loop filter 845 always select a candidate luma sample at the position of (or closest to) the current pixel position, unless otherwise explicitly overridden by syntax from the bitstream 895 by the entropy decoder 890. In some embodiments, only a subset (e.g., 4 out of 9) of the candidate luma samples in the vicinity of the current pixel position are eligible to be selected as the luma collocated sample or used for deriving the luma collocated sample of the current pixel position. In some embodiments, the in-loop filter 845 computes a classification index based on differences between adjacent candidate luma samples (in the vicinity of the current pixel position) relative to a particular threshold that is determined based on a bit depth of the current sample. Some of the CCSAO operations of the in-loop filter 845 are described in Section I above.

Figure 9:
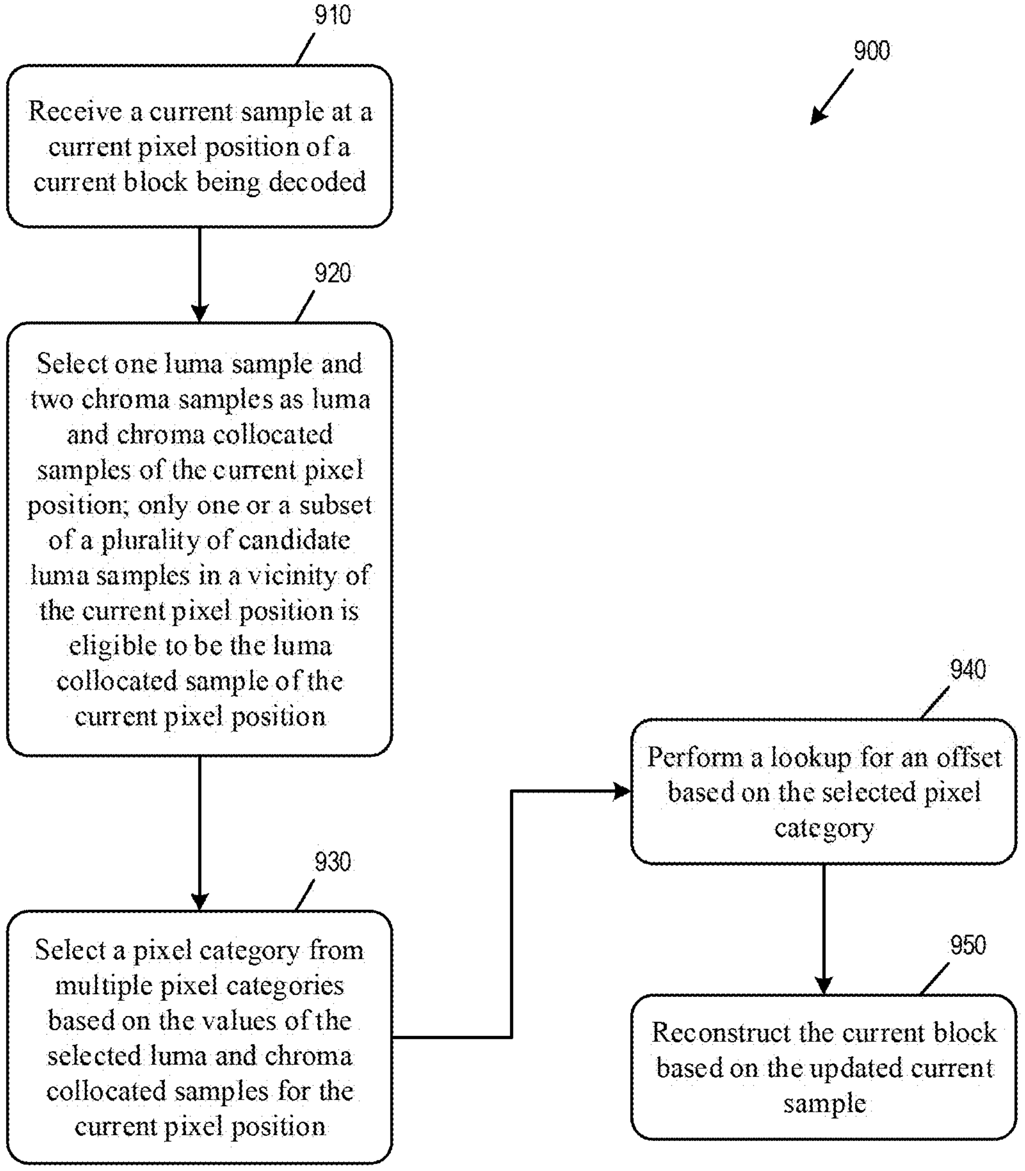
FIG. 9 conceptually illustrates a process for performing CCSAO in some embodiments.

FIG. 9 conceptually illustrates a process 900 for performing CCSAO in some embodiments. In some embodiments, one or more processing units (e.g., a processor) of a computing device implementing the decoder 800 performs the process 900 by executing instructions stored in a computer readable medium. In some embodiments, an electronic apparatus implementing the decoder 800 performs the process 900.

The decoder receives (at block 910) a current sample at a current pixel position of a current block being decoded.

The decoder selects (at block 920) one luma sample and two chroma samples as luma and chroma collocated samples of the current pixel position. In some embodiments, only one out of a plurality of candidate luma samples in a vicinity of the current pixel position is eligible to be the luma collocated sample of the current pixel position. The vicinity of the current pixel position may encompass eight candidate luma samples surrounding the current pixel position and one candidate luma sample at a center position of the vicinity of the current pixel position, and the selected luma collocated sample is at the center position of the vicinity of the current pixel position. In some embodiments, the candidate luma sample at the center position is selected as the luma collocated sample implicitly without being signaled in a bitstream.

In some embodiments, only a subset of the plurality of candidate luma samples in the vicinity of the current pixel position are eligible to be selected as the luma collocated sample or used for deriving the luma collocated sample of the current pixel position. For example, the plurality of candidate luma samples may include nine luma samples while the eligible subset of the plurality of candidate luma samples may include only four candidate luma samples. In some embodiments, a linear average of two or more candidate luma samples selected from the eligible subset of the plurality of candidate luma samples is used as the selected luma collocated sample.

The decoder selects (at block 930) a pixel category from a plurality of pixel categories based on values of the selected luma and chroma collocated samples for the current pixel position. In some embodiments, a first classification index is computed based on the values of the selected luma and chroma collocated samples for the current pixel position (e.g., Eq. (2) or (8)), a second classification index is computed based on differences between adjacent candidate luma samples (in the vicinity of the current pixel position) relative to a particular threshold (e.g., Eq. (15) or (16)), and the pixel category is selected by using the first and second classification indices (e.g., Eq. (6) and (7)). In some embodiments, the particular threshold is determined based on a bit depth of the current sample.

The decoder performs (at block 940) a lookup for an offset based on the selected pixel category. The decoder updates (at block 950) the current sample by applying the offset (e.g., Eq. (7)).

The decoder reconstructs (at block 960) the current block based on the updated current sample.

The decoder may then provide the reconstructed current block for display as part of the reconstructed current picture.

IV. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 10:
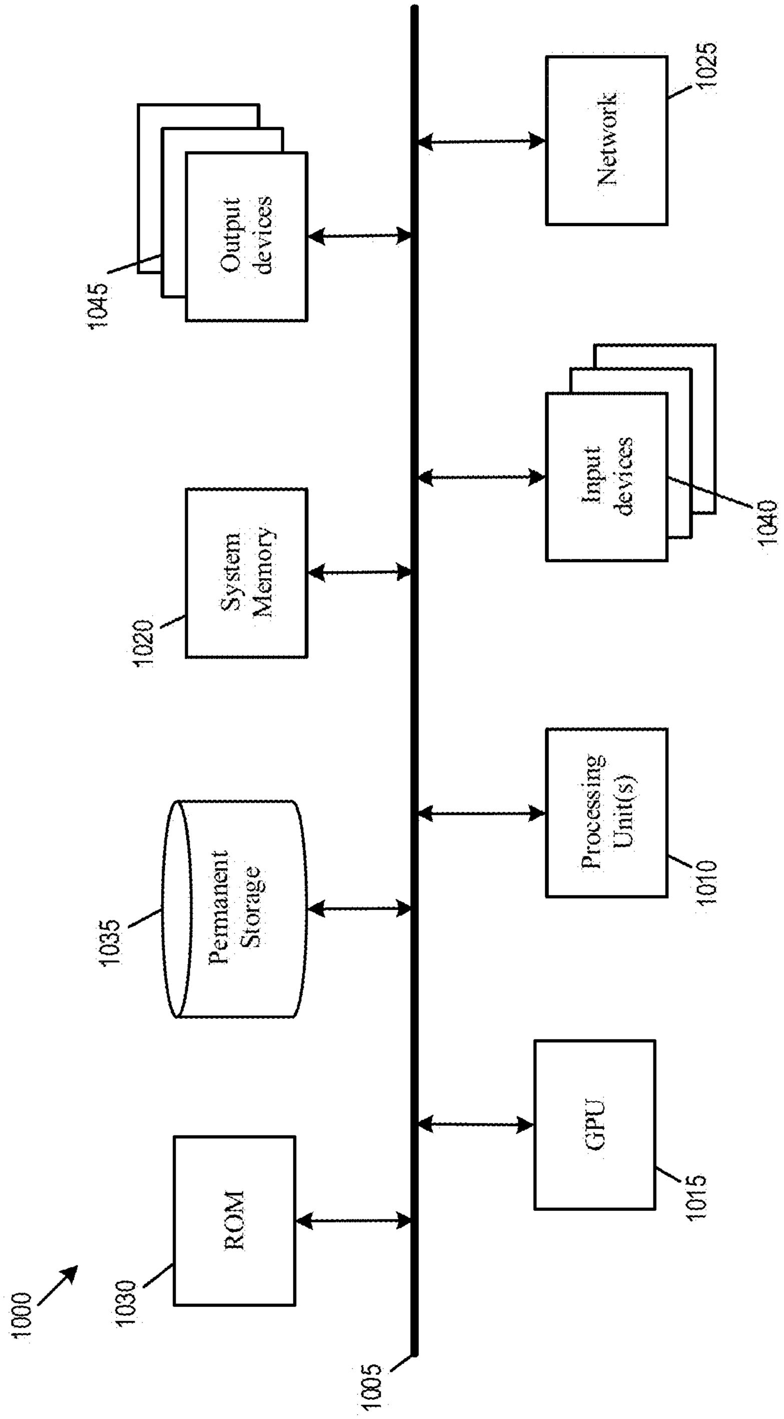
FIG. 10 conceptually illustrates an electronic system with which some embodiments of the present disclosure are implemented.

FIG. 10 conceptually illustrates an electronic system 1000 with which some embodiments of the present disclosure are implemented. The electronic system 1000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1000 includes a bus 1005, processing unit(s) 1010, a graphics-processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the GPU 1015, the read-only memory 1030, the system memory 1020, and the permanent storage device 1035.

From these various memory units, the processing unit(s) 1010 retrieves instructions to execute and data to process in order to execute the processes of the present disclosure. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are used by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the present disclosure use a mass-storage device (such as a magnetic or optical disk and its corresponding disk drive) as the permanent storage device 1035.

Other embodiments use a removable storage device (such as a floppy disk, flash memory device, etc., and its corresponding disk drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor uses at runtime. In some embodiments, processes in accordance with the present disclosure are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 7 and FIG. 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:

receiving a current sample at a current pixel position of a current block being coded;

selecting one luma sample and two chroma samples as luma and chroma collocated samples of the current pixel position, wherein only a subset of a plurality of candidate luma samples in a vicinity of the current pixel position are eligible to be selected as the luma collocated sample or used for deriving the luma collocated sample of the current pixel position, wherein the candidate luma sample at a center position of the vicinity of the current pixel position is selected as the luma collocated sample implicitly without being signaled in a bitstream;

selecting a pixel category from a plurality of pixel categories based on the values of the selected luma and chroma collocated samples for the current pixel position;

performing a lookup for an offset based on the selected pixel category;

updating the current sample by applying the offset; and encoding or decoding the current block based on the updated current sample.

2. The video coding method of claim 1, wherein the vicinity of the current pixel position encompasses eight candidate luma samples surrounding the current pixel position and one candidate luma sample at a center position of the vicinity of the current pixel position.

3. The video coding method of claim 2, wherein the selected luma collocated sample is at the center position of the vicinity of the current pixel position.

4. The video coding method of claim 1, wherein a first classification index is computed based on the values of the selected luma and chroma collocated samples for the current pixel position, the method further comprising:

computing a second classification index based on differences between adjacent candidate luma samples (in the vicinity of the current pixel position) relative to a particular threshold, wherein the pixel category is selected by using the first and second classification indices.

5. The video coding method of claim 4, wherein the particular threshold is determined based on a bit depth of the current sample.

6. An electronic apparatus comprising:

a video coder circuit configured to perform operations comprising:

receiving a current sample at a current pixel position of a current block being coded;

selecting one luma sample and two chroma samples as luma and chroma collocated samples of the current pixel position, wherein only a subset of a plurality of candidate luma samples in a vicinity of the current pixel position are eligible to be selected as the luma collocated sample or used for deriving the luma collocated sample of the current pixel position, wherein the candidate luma sample at a center position of the vicinity of the current pixel position is selected as the luma collocated sample implicitly without being signaled in a bitstream;

selecting a pixel category from a plurality of pixel categories based on the values of the selected luma and chroma collocated samples for the current pixel position;

performing a lookup for an offset based on the selected pixel category;

updating the current sample by applying the offset; and encoding or decoding the current block based on the updated current sample.

7. A video decoding method comprising:

receiving a current sample at a current pixel position of a current block being decoded;

selecting one luma sample and two chroma samples as luma and chroma collocated samples of the current pixel position, wherein only a subset of a plurality of candidate luma samples in a vicinity of the current pixel position are eligible to be selected as the luma collocated sample or used for deriving the luma collocated sample of the current pixel position, wherein the candidate luma sample at a center position of the vicinity of the current pixel position is selected as the luma collocated sample implicitly without being signaled in a bitstream;

selecting a pixel category from a plurality of pixel categories based on the values of the selected luma and chroma collocated samples for the current pixel position;

performing a lookup for an offset based on the selected pixel category;

updating the current sample by applying the offset; and reconstructing the current block based on the updated current sample.

8. The video coding method of claim 1, wherein one or more candidate luma samples in one or more directions in the vicinity of the current pixel position are excluded to be selected as the luma collocated sample or used for deriving the luma collocated sample of the current pixel position.

* * * * *